United States Patent
Kimura et al.

(10) Patent No.: US 10,307,869 B2
(45) Date of Patent: Jun. 4, 2019

(54) ALUMINUM ALLOY BRAZING SHEET FOR ELECTRIC RESISTANCE WELDING

(71) Applicant: Kobe Steel, Ltd., Kobe-shi (JP)

(72) Inventors: Shimpei Kimura, Moka (JP); Toshiki Ueda, Moka (JP); Takahiro Izumi, Moka (JP); Yuji Shibuya, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 102 days.

(21) Appl. No.: 15/129,021

(22) PCT Filed: Mar. 27, 2015

(86) PCT No.: PCT/JP2015/059605
§ 371 (c)(1),
(2) Date: Sep. 26, 2016

(87) PCT Pub. No.: WO2015/147256
PCT Pub. Date: Oct. 1, 2015

(65) Prior Publication Data
US 2018/0214990 A1    Aug. 2, 2018

(30) Foreign Application Priority Data
Mar. 28, 2014  (JP) ................................ 2014-068482

(51) Int. Cl.
*B32B 15/01*    (2006.01)
*B23K 35/28*    (2006.01)
(Continued)

(52) U.S. Cl.
CPC ........ *B23K 35/286* (2013.01); *B23K 35/0222* (2013.01); *B23K 35/0233* (2013.01);
(Continued)

(58) Field of Classification Search
None
See application file for complete search history.

(56) References Cited

U.S. PATENT DOCUMENTS

| 4,785,092 A | * | 11/1988 | Nanba | ................. B23K 35/286 228/262.51 |
| 2003/0051342 A1 | | 3/2003 | Hasegawa et al. | |

(Continued)

FOREIGN PATENT DOCUMENTS

| JP | 11-47919 A | 2/1999 |
| JP | 2003-39194 A | 2/2003 |

(Continued)

OTHER PUBLICATIONS

International Preliminary Report of Patentability and Written Opinion dated Oct. 13, 2016 in PCT/JP2015/059605 (with English translation).
International Search Report dated Jun. 9, 2015 in PCT/JP2015/059605, filed Mar. 27, 2015.

*Primary Examiner* — Seth Dumbris
(74) *Attorney, Agent, or Firm* — Oblon, McClelland, Maier & Neustadt, L.L.P.

(57) ABSTRACT

The present invention provides an aluminum alloy brazing sheet for electric resistance welding, which has high strength while being thinned and can reduce the occurrence of welding defects in the electric resistance welding. Disclosed is an aluminum alloy brazing sheet for electric resistance welding, including a core layer and a brazing filler layer cladded on at least one surface of the core layer, wherein the brazing filler layer is made of an aluminum alloy comprising Si: 5.5 to 12.0% by mass, and at least one of Na: 0.0003 to 0.0030% by mass and Sr: 0.0020 to 0.1000% by mass, with the balance being Al and inevitable impurities, wherein the brazing filler layer in a molten state at 650° C. exhibits a viscosity of 0.01 Pa·s or less.

6 Claims, 2 Drawing Sheets

(51) Int. Cl.
*B23K 35/22* (2006.01)
*C22C 21/00* (2006.01)
*C22C 21/02* (2006.01)
*C22C 21/04* (2006.01)
*B23K 35/02* (2006.01)
*B32B 15/20* (2006.01)

(52) U.S. Cl.
CPC ...... *B23K 35/0238* (2013.01); *B23K 35/0255* (2013.01); *B23K 35/22* (2013.01); *B23K 35/28* (2013.01); *B32B 15/016* (2013.01); *B32B 15/20* (2013.01); *C22C 21/00* (2013.01); *C22C 21/02* (2013.01); *C22C 21/04* (2013.01); *Y10T 428/12764* (2015.01)

(56) References Cited

U.S. PATENT DOCUMENTS

| | | | |
|---|---|---|---|
| 2007/0000969 A1* | 1/2007 | Mittlefehldt | B23K 1/19 228/101 |
| 2011/0287277 A1* | 11/2011 | Kimura | B23K 35/28 428/555 |

FOREIGN PATENT DOCUMENTS

| | | | | |
|---|---|---|---|---|
| JP | 2003-293061 A | | 10/2003 | |
| JP | 2003-293062 A | | 10/2003 | |
| JP | 2003293062 | * | 10/2003 | ............. C22C 21/00 |
| JP | 2011-241439 A | | 12/2011 | |
| JP | 2011-241440 A | | 12/2011 | |
| JP | 2012001748 | * | 1/2012 | ............. C22C 21/00 |

* cited by examiner

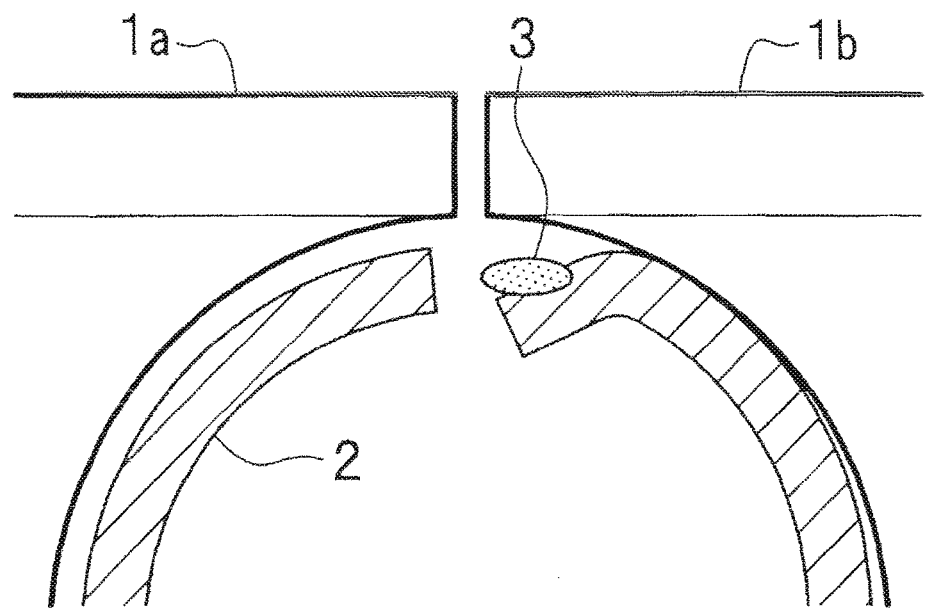

ALUMINUM ALLOY BRAZING SHEET FOR ELECTRIC RESISTANCE WELDING

TECHNICAL FIELD

The present invention relates to an aluminum alloy brazing sheet for electric resistance welding used for automobile heat exchangers and the like.

BACKGROUND ART

Brazing sheets have been conventionally used as material for tubes in automobile heat exchanges, such as a radiator and a heater core. A brazing sheet is made of an aluminum alloy (hereinafter simply referred to as an "Al alloy") including a core layer and a brazing filler layer and/or a sacrificial layer disposed on one or both sides of the core layer. The typical tube for use is one produced by winding, in a tube shape, a brazing sheet with a three-layered structure mainly made of an Al alloy (brazing filler layer/core layer/sacrificial layer) with the sacrificial layer placed on the inside.

In general, an electric resistance welding method is used to form the brazing sheet into a tube. That is, in order to form the brazing sheet into a longitudinally tube shape, a strip-shaped brazing sheet is permitted to pass through a number of forming rolls and then formed gradually into a rounded tube shape, thereby producing an open pipe. Next, a coil positioned away from the outer periphery of the open pipe is used to heat only the vicinity of an open part at a high temperature by high-frequency induction heating. Thereafter, the open pipe are pressurized from both sides thereof by a pair of squeeze rolls disposed vertically to pressure-weld both ends of the open pipe, thereby closing the open part to produce a continuous tube.

In recent years, tubes made of aluminum alloy brazing sheets for use in heat exchangers of automobiles and the like have been developed to achieve high strength, high corrosion resistance and so on, in order to decrease the weight and thickness of materials. However, with decreasing thickness, welding defects tend to increase in the electric resistance welding for the tube. Thus, the improvement of the pipe productivity in the electric resistance welding, that is, electric resistance weldability, is strongly required.

As measures for improving the electric resistance weldability, various techniques have been conventionally developed. Patent Document 1 supposes that the degradation of electric resistance weldability is caused by an inappropriate area occupancy rate of Zn—Mg based intermetallic compounds on the surface of a sacrificial layer, and thus proposes that the area occupancy rate of Zn—Mg based intermetallic compounds is restricted to 1.0% or less. Patent Document 2 supposes that the degradation of electric resistance weldability is caused by the inappropriate number density of Al—Cu based intermetallic compounds in the core layer, and thus proposes that the number density of the intermetallic compounds is restricted to 10 pieces/$\mu m^2$ or less.

PRIOR ART DOCUMENT

Patent Document

Patent Document 1: JP 2011-241439 A
Patent Document 2: JP 2011-241440 A

DISCLOSURE OF THE INVENTION

Problems to be Solved by the Invention

The means proposed in Patent Document 1 focuses on the sacrificial layer, and the means proposed in Patent Document 2 focuses on the core layer. However, such means only for the sacrificial and core layers might become insufficient because the rate of brazing filler layer in the tube in its thickness direction increases with the decreasing thickness of the tube.

The present invention has been made in view of the foregoing circumstances, and it is an object of the present invention to provide a thinned, high-strength aluminum alloy brazing sheet for electric resistance welding which can reduce the occurrence of welding defects in electric resistance welding.

Means for Solving the Problems

The inventors have been diligently studied about causes for the occurrence of welding defects in the electric resistance welding. As a result, it is found that welding defects are related to the phenomena that a spatter (fine molten substances made of metal or the like) which scatters from a weld bead is spread over the outer surface side (a brazing filler layer side) of the tube when welding, and that the excessive melting occurs in welding. A further study through various experiments shows that the spatter spread over the outer surface side of the tube mainly contains the brazing filler layer of the brazing sheet, and that the size of the spatter is significantly related to the viscosity of the brazing filler layer in melting. In particular, for the thinned tubes, the rate of the brazing filler layer in the brazing sheet becomes higher, which drastically affects the welding defects.

Accordingly, the present invention has been made based on many findings such as those mentioned above.

That is, an aluminum alloy brazing sheet for electric resistance welding according to the present invention includes a core layer and a brazing filler layer cladded on at least one surface of the core layer, wherein the brazing filler layer is made of an aluminum alloy including Si: 5.5 to 12.0% by mass, and at least one of Na: 0.0003 to 0.0030% by mass and Sr: 0.0020 to 0.1000% by mass, with the balance being Al and inevitable impurities, wherein the brazing filler layer in a molten state at 650° C. exhibits a viscosity of 0.01 Pa·s or less.

In the aluminum alloy brazing sheet with such a structure, the viscosity of the brazing filler layer in a molten state at 650° C. is restricted to 0.01 Pa·s or less, thereby decreasing the size of a spatter and suppressing the occurrence of welding defects in the electric resistance welding.

In an aluminum alloy brazing sheet for electric resistance welding of the present invention, a core layer is made of an aluminum alloy including Si: 0.10 to 1.00% by mass, Cu: 0.50 to 1.20% by mass, and Mn: 0.50 to 2.00% by mass, with the balance being Al and inevitable impurities.

The aluminum alloy brazing sheet with this structure can have much higher strength while being thinned.

In the aluminum alloy brazing sheet for electric resistance welding of the present invention, the core layer further includes at least one selected from Ti: 0.05 to 0.25% by mass, Cr: 0.05 to 0.25% by mass, and Mg: 0.05 to 0.50% by mass.

The aluminum alloy brazing sheet with this structure can have much higher strength and excellent corrosion resistance.

An aluminum alloy brazing sheet for electric resistance welding according to the present invention further includes a sacrificial layer cladded on the other surface of the core layer, wherein the sacrificial layer is made of an aluminum alloy including Si: exceeding 0.20% by mass and 0.80% or less by mass, Zn: exceeding 2.00% by mass and 5.00% or less by mass, and Mg: 1.00 to 4.50% by mass, with the balance being Al and inevitable impurities.

The aluminum alloy brazing sheet with this structure can have excellent corrosion resistance while being thinned.

Effects of the Invention

Accordingly, the aluminum alloy brazing sheet for electric resistance welding of the present invention has high strength while being thinned and can reduce the occurrence of welding defects in the electric resistance welding.

BRIEF DESCRIPTION OF THE DRAWINGS

FIG. 2A shows a state in which the spatter is attached to the inside of a squeeze roll.

FIG. 2B is another schematic diagram illustrating the state of attachment of a spatter during electric resistance welding the aluminum alloy brazing sheet for electric resistance welding of the present invention, showing an enlarged diagram of a part enclosed by an alternate long and short dash line in FIG. 1. Specifically, FIG. 2B shows a state in which the spatter is attached at an end of a tube formed from the brazing sheet.

MODE FOR CARRYING OUT THE INVENTION

Embodiments for carrying out an aluminum alloy brazing sheet for electric resistance welding of the present invention will be described in detail below.

In the aluminum alloy brazing sheet for electric resistance welding of the present invention, a brazing filler layer is cladded on at least one surface of a core layer. On the other surface of the core layer, a brazing filler layer may be cladded, or a sacrificial layer may be cladded. However, the aluminum alloy brazing sheet for electric resistance welding having the other surface thereof cladded with the sacrificial layer is more preferable because of excellent corrosion resistance.

(Viscosity of Brazing Filler Layer and Maximum Particle Size of Eutectic Si Particles in Brazing Filler Layer)

The inventors have studied in detail the forming steps of an electric resistance welded tube in relation to the increase in welding defects in the electric resistance welding process for a thinned tube. As a result, it is found that welding defects are caused by the following phenomena: the brazing sheet is partially melted during heating welding to scatter the spatters around the sheet, whereby the spatters scatted toward the outer surface side of the tube material mainly contain a brazing filler layer component; some of the spatters scattering toward the outer surface side of the tube are attached to the inner side of the squeeze roll and the end part of the brazing sheet; and the spatter present on the inner side of the squeeze roll or the end of the brazing sheet causes the welding defects.

Further, the spatter scattered toward the outer surface side of the tube relates to the viscosity of the molten brazing filler layer. When the molten brazing filler layer has high viscosity, the molten spatter also has high viscosity, and thus is more likely to be attached to the squeeze roll. When a spatter is attached to the squeeze roll, butting of the end parts of the brazing sheet is made unstable in welding.

A spatter having a high viscosity in a molten state tends to increase its size. Thus, when the coarse spatter is attached to the end part of the brazing sheet, the butting of the end parts of the brazing sheet is made unstable in the welding, causing fine welding defects with a size of less than 5 mm.

Figure 1:
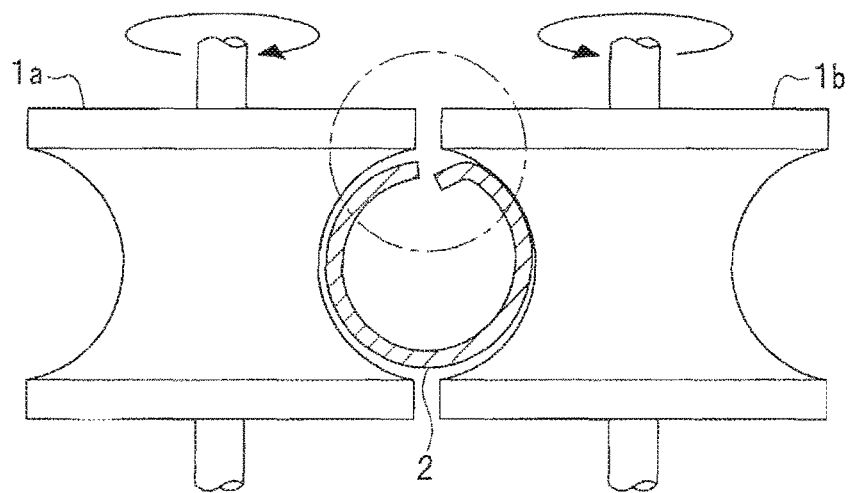
FIG. 1 is a schematic diagram showing an aluminum alloy brazing sheet for electric resistance welding of the present invention when performing the electric resistance welding.

FIG. 1 is a schematic diagram showing an aluminum alloy brazing sheet for electric resistance seam welding of the present invention when performing the electric resistance seam welding. As shown in the figure, a tube 2 formed from the brazing sheet is pressurized from both sides by a pair of squeeze rolls 1a and 1b arranged on the both sides the tube 2.

Figure 2A:
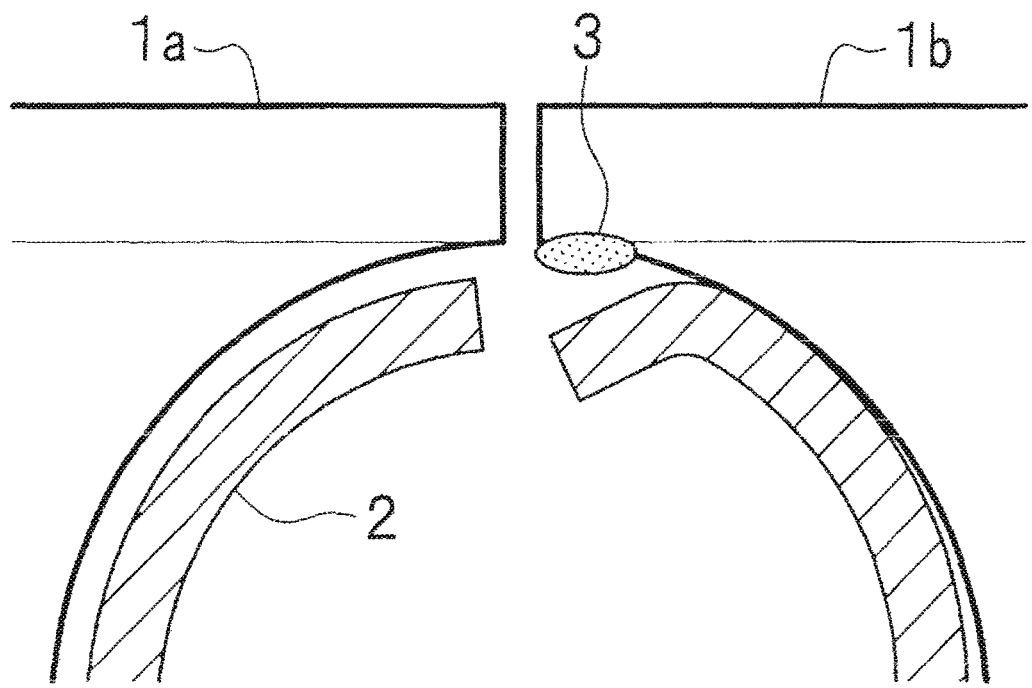
FIG. 2A is a schematic diagram illustrating the state of attachment of a spatter during electric resistance welding the aluminum alloy brazing sheet for electric resistance welding of the present invention, showing an enlarged diagram of a part enclosed by an alternate long and short dash line in FIG. 1. Specifically.

FIGS. 2A and 2B schematically show the states of attachment of spatters during electric resistance seam welding the aluminum alloy brazing sheet for electric resistance seam welding of the present invention. Specifically, FIG. 2A shows the state in which a spatter 3 is attached to the inside of a squeeze roll 1b. FIG. 2B shows the state in which the spatter 3 is attached to an end part of a tube 2 formed from the brazing sheet.

As a result of examining the relationship between the viscosity of the brazing filler layer in the molten state and the frequency of occurrence of welding defects in the electric resistance welding, it is found that the viscosity of the molten brazing filler layer at 650° C. needs to be 0.01 Pa·s or less in order to reduce the occurrence of the welding defects by the scattered spatters. The viscosity of the molten brazing filler layer at 650° C. can be measured by an oscillating-plate viscometer to be mentioned later. To reduce the viscosity of the molten brazing filler layer to 0.01 Pa·s or less, the element composition of the brazing filler layer is to be set at a specific one as will be mentioned later. In this way, the viscosity of the brazing filler layer can be controlled.

Furthermore, the inventors have additionally studied about the refinement of the eutectic Si particles that exist in a brazing filler layer made of an Al—Si based alloy from the need to ensure the fluidity of the brazing filler layer when bonding by brazing. This is because the coarse eutectic Si particles drastically reduce the fluidity of the brazing filler layer.

After studying the respective elements of the brazing filler layer, including a minor component, in more detail, it is revealed that when using Na as a refining agent for the eutectic Si particles in an Al—Si based alloy, a Na content needs to be set within a range of 0.0003 to 0.0030% by mass, whereas when using Sr, an Sr content needs to be set within a range of 0.0020 to 0.1000% by mass. Such setting not only can suppress the coarsening of the eutectic Si particles in the brazing filler layer, but also can reduce the viscosity of the molten brazing filler layer at 650° C. to 0.01 Pa·s or less, that is, can satisfy both conditions at the same time.

Furthermore, the inventors have revealed that the eutectic Si particles in the brazing filler layer not only interrupt the fluidity of the above-mentioned brazing filler layer, but also destabilize the melting of the brazing filler layer in the electric resistance welding when the maximum particle size of the eutectic Si particle in the brazing filler layer exceeds 40 µm. This results in the excessive melting of a weld bead, which also destabilizes the butting between the end parts of the brazing sheet, possibly causing the welding defects of 5 mm or more in size.

The composition of respective materials forming the aluminum alloy brazing sheet for electric resistance welding will be described below.

(Brazing Filler Layer)

A brazing filler layer of the aluminum alloy brazing sheet for electric resistance welding of the present invention is made of an aluminum alloy that contains, Si: 5.5 to 12.0% by mass, and at least one element of Na: 0.0003 to 0.0030% by mass and Sr: 0.0020 to 0.1000% by mass, with the balance being Al and inevitable impurities.

The respective elements forming the brazing filler layer will be described below.

(Si: 5.5 to 12.0% by Mass)

Silicon (Si) has the effect of reducing a solidus temperature of an aluminum alloy to enhance the fluidity of the brazing filler layer at a brazing temperature. When the Si content is less than 5.5% by mass, the absolute amount of a liquid phase of the brazing filler layer becomes insufficient at a brazing temperature of 580 to 630° C. in the brazing. For example, when brazing at 600° C., a sufficient volume of fillet (charged brazing filler layer, or solidified portion) cannot be ensured, resulting in insufficient brazability. On the other hand, when the Si content exceeds 12.0% by mass, coarse primary crystal particles of Si tend to be generated in a solidification step during casting of the brazing filler layer. Coarse Si primary crystal particles having a particle size of more than about 40 µm are generated in some cases. Accordingly, the Si content is set at 5.5 to 12.0% by mass. The Si content is preferably in a range of 6.5 to 11.5% by mass.

(Na: 0.0003 to 0.0030% by Mass)

Sodium (Na) is used as the refining agent for eutectic Si particles of the brazing filler layer. When the Na content is less than 0.0003% by mass, such an effect is not sufficient. On the other hand, when the Na content exceeds 0.0030% by mass, the viscosity of the molten brazing filler layer exceeds 0.01 Pa·s. Thus, in the brazing filler layer containing Na, the Na content in the brazing filler layer is set at 0.0003 to 0.0030% by mass. The Na content is preferably within a range of 0.0004 to 0.0025% by mass, and more preferably within a range of 0.0005 to 0.0015% by mass.

(Sr: 0.0020 to 0.1000% by Mass)

Like Na, strontium (Sr) is used as the refining agent for eutectic Si particles of the brazing filler layer. However, the Sr is less effective in increasing the viscosity of the brazing filler layer as its increasing content, compared to Na. It is found that the Sr content of 0.0020 to 0.1000% by mass results in the viscosity of 0.01 Pa·s or less, not causing coarse Si particles. When the Sr content in the brazing filler layer is less than 0.0020% by mass, the adequate refining effect of the eutectic Si particles cannot be obtained. On the other hand, when the Sr content exceeds 0.1000% by mass, the viscosity of the molten brazing filler layer might exceed 0.01 Pa·s. Thus, in the brazing filler layer containing Sr, the Sr content in the brazing filler layer is set at 0.0020 to 0.1000% by mass. The Sr content is preferably within a range of 0.0030 to 0.0300% by mass, and more preferably not less than 0.0035 and less than 0.0100% by mass.

Both the above-mentioned Na and Sr are used as the refining agents for the eutectic Si particles in the brazing filler layer. The brazing filler layer needs to contain at least one of Na and Sr.

(Balance being Al and Inevitable Impurities)

The balance of an Al alloy in the brazing filler layer includes Al and inevitable impurities. The inevitable impurities can be supposed to be elements, such as Fe, Zn, C, Ni, Ca and V. Preferably, to prevent each of these elements from interrupting the features of the present invention, the content of each element is set at less than 0.05% by mass, and the total content of these elements is preferably 0.30% or less by mass.

The brazing filler layer preferably has a thickness of 10 to 60 µm, and more preferably 15 to 50 µm in view of brazability. The brazing filler layer is preferably cladded at a cladding rate of 10 to 40%.

A core layer included in the aluminum alloy brazing sheet for electric resistance welding of the present invention will be described below.

(Core Layer)

An aluminum alloy used in the core layer for the aluminum alloy brazing sheet for electric resistance welding of the present invention can be any one of 2000 series, 3000 series, 5000 series and 6000 series aluminum alloys. These aluminum alloys can be used sufficiently in view of the physical properties as an aluminum alloy brazing sheet for applications of automobile heat exchangers and the like.

Among them, the aluminum alloy as one embodiment included in the core layer of the aluminum alloy brazing sheet for electric resistance welding of the present invention preferably contains, Si: 0.10 to 1.00% by mass, Cu: 0.50 to 1.20% by mass, and Mn: 0.50 to 2.00% by mass, with the balance being Al and inevitable impurities.

The aluminum alloy as another embodiment included in the core layer of the aluminum alloy brazing sheet for electric resistance welding of the present invention preferably contains, Si: 0.10 to 1.00% by mass, Cu: 0.50 to 1.20% by mass, Mn: 0.50 to 2.00% by mass, and at least one element selected from Ti: 0.05 to 0.25% by mass, Cr: 0.05 to 0.25% by mass, and Mg: 0.05 to 0.50% by mass, with the balance being Al and inevitable impurities.

(Si in the Core Layer: 0.10 to 1.00% by Mass)

Silicon (Si) coexists with magnesium (Mg) to form $Mg_2Si$, and thereby has the effect of improving the tensile strength of the brazed aluminum alloy. When the Si content is less than 0.10% by mass, such an effect becomes small. On the other hand, when the Si content exceeds 1.00% by mass, the solidus temperature of the core layer is decreased, whereby the core layer might melt during brazing, thus degrading the corrosion resistance. Accordingly, the Si content is set at 0.10 to 1.00% by mass. The Si content is more preferably set within a range of 0.20 to 0.90% by mass.

(Cu in the Core Layer: 0.50 to 1.20% by Mass)

Copper (Cu) has the effect of improving the tensile strength of an aluminum alloy by being solid-soluted. When the Cu content is less than 0.50% by mass, the effect of improving the tensile strength of the aluminum alloy becomes insufficient. On the other hand, when the Cu content exceeds 1.20% by mass, the solidus temperature of the core layer is decreased, and thus the core layer might melt during the brazing, thus degrading the corrosion resistance. Thus, the Cu content is set at 0.50 to 1.20% by mass. The Cu content is preferably within a range of 0.60 to 1.00% by mass.

(Mn in the Core Layer: 0.50 to 2.00% by Mass)

Manganese (Mn) has the effect of forming an Al—Mn—Si based intermetallic compound to improve the tensile strength of the brazed aluminum alloy. When the Mn content is less than 0.50% by mass, the effect of improving the tensile strength of the aluminum alloy becomes insufficient.

On the other hand, when the Mn content exceeds 2.00% by mass, the amount of coarse intermetallic compounds formed during casting might increase to degrade the formability. Thus, the Mn content is set at 0.50 to 2.00% by mass. The Mn content is more preferably within a range of 0.70 to 1.70% by mass.

(Ti in the Core Layer: 0.05 to 0.25% by Mass)

Titanium (Ti) forms a Ti—Al based compound in an Al alloy and is dispersed in the form of layer. The Ti—Al based compound has an electropositive potential, and corrosion form is to be layered. The Ti—Al based compound has the effect of suppressing the progress of the corrosion in the thickness direction (pitting corrosion). When the Ti content is less than 0.05% by mass, such an effect of forming the corrosion in the layered shape becomes small. On the other hand, when the Ti content exceeds 0.25% by mass, the formation of coarse intermetallic compounds might degrade the formability. Thus, in the core layer containing Ti, the Ti content is set at 0.05 to 0.25% by mass. The Ti content is more preferably within a range of 0.07 to 0.20% by mass.

(Cr in the Core Layer: 0.05 to 0.25% by Mass)

Chromium (Cr) is added to distribute a fine precipitation phase containing $Al_3Cr$ dispersed particles, and thus has the effect of improving the tensile strength after the brazing. When the Cr content is less than 0.05% by mass, the above-mentioned effect becomes insufficient. On the other hand, when the Cr content exceeds 0.25% by mass, coarse $Al_3Cr$ intermetallic compounds are more likely to be formed during casting, thus degrading the corrosion resistance. Thus, in the core layer containing Cr, the Cr content is set at 0.05 to 0.25% by mass. The Cr content is more preferably within a range of 0.07 to 0.20% by mass.

(Mg in the Core Layer: 0.05 to 0.50% by Mass)

Magnesium (Mg) coexists with Si to form $Mg_2Si$, and thereby has the effect of improving the tensile strength of the brazed aluminum alloy. When the Mg content is less than 0.05% by mass, such an effect becomes small. On the other hand, when the Mg content exceeds 0.50% by mass, the amount of Mg dissolved in the flux during heating for brazing increases, thus making the function of the flux deteriorate, and degrading the brazability. Thus, in the core layer containing Mg, the Mg content is set at 0.05 to 0.50% by mass.

(Balance in the Core Layer being Al and Inevitable Impurities)

The balance of the Al alloy in the core layer includes Al and inevitable impurities. Inevitable impurities are supposed to include Fe, Zn, C, Ni, Na, Ca, V, etc. The Fe content may be 0.50% or less by mass. The content of each of other elements except for Fe is preferably set at less than 0.05% by mass, and the total content of these elements is preferably set at less than 0.30% by mass in order not to interrupt the features of the present invention.

A sacrificial layer included in the aluminum alloy brazing sheet for electric resistance welding of the present invention will be described below.

(Sacrificial Layer)

The aluminum alloy brazing sheet for electric resistance welding of the present invention includes the brazing filler layer provided on one surface of the core layer, and may include a sacrificial layer cladded on the other surface of the core layer in order to improve the corrosion resistance of this surface (i.e. the other surface). When fabricating a brazing bonded structure using the brazing sheet with the sacrificial layer, the fabricated component is to be formed in such a manner that the surface having the sacrificial layer thereon is directed toward a corrosion environment.

The aluminum alloy used in the sacrificial layer of the aluminum alloy brazing sheet for electric resistance welding of the present invention can be 7000 series aluminum alloy that contains Zn. This aluminum alloy may further contain Si, Mn and the like. For example, the aluminum alloy used for the sacrificial layer can be an Al—Mg—Si—Zn alloy, an Al—Si—Mn—Zn based alloy, an Al—Mg—Zn based alloy, etc.

Among them, the aluminum alloy forming the sacrificial layer of the aluminum alloy brazing sheet for electric resistance welding of the present invention preferably contains, Si: exceeding 0.20% by mass and 0.80% or less by mass, Zn: exceeding 2.00% by mass and 5.00% or less by mass, and Mg: 1.00 to 4.50% by mass, with the balance being Al and inevitable impurities.

(Si in the Sacrificial Layer: Exceeding 0.20% by Mass and 0.80% or Less by Mass)

Si acts to enhance the tensile strength of the sacrificial layer. When the Si content is 0.20% or less by mass, the effect of improving the tensile strength becomes insufficient. On the other hand, when the Si content exceeds 0.80% by mass, the solidus temperature of the sacrificial layer is decreased, whereby the sacrificial layer might melt during heating for brazing, which might lead to the degradation in corrosion resistance. Accordingly, the Si content should exceed 0.20% by mass and be 0.80% or less by mass. The Si content is more preferably within a range of 0.25 to 0.70% by mass.

(Zn in the Sacrificial Layer: Exceeding 2.00% by Mass and 5.00% or Less by Mass)

Zinc (Zn) has the effect of making the potential of the sacrificial layer electronegative to retain the function of sacrificial corrosion protection. When the Zn content is 2.00% or less by mass, the function of sacrificial corrosion protection tends to become insufficient. On the other hand, when the Zn content exceeds 5.00% by mass, a difference in electric potential between the sacrificial layer and the core layer becomes larger, increasing the wearing rate of the sacrificial layer, which might not possibly ensure the sufficient corrosion resistance. Accordingly, the Zn content is set to exceed 2.00% by mass and be 5.00% or less by mass. The Zn content is more preferably within a range of 2.50 to 4.50% by mass.

(Mg in the Sacrificial Layer: 1.00 to 4.50% by Mass)

Mg in the sacrificial layer is dispersed into the core layer during the brazing. Mg coexists with Si in the core layer and the sacrificial layer to form $Mg_2Si$, thereby improving the tensile strength of the brazed aluminum alloy. When the Mg content is less than 1.00% by mass, this effect becomes small. On the other hand, the Mg content exceeding 4.50% by mass makes it difficult to roll the clad material. Even if the rolling is possible, the solidus temperature of the sacrificial layer is decreased, and the sacrificial layer might melt during brazing, thus degrading the corrosion resistance. Accordingly, the Mg content is set at 1.00 to 4.50% by mass. The Mg content is more preferably set within a range of 1.50 to 4.00% by mass.

(Balance of the Sacrificial Layer being Al and Inevitable Impurities)

The balance of the Al alloy of the sacrificial layer includes Al and inevitable impurities. Inevitable impurities are supposed to include Fe, C, Ni, Na, Ca, V, etc. The Fe content may be 0.50% or less by mass. The content of each of other elements except for Fe is preferably set at less than 0.05% by mass, and the total content of these elements is preferably set at 0.30% or less by mass in order not to interrupt the features of the present invention.

When the aluminum alloy brazing sheet for electric resistance welding of the present invention has a thickness exceeding 0.35 mm, its thickness is so large that welding defects caused by the factor mentioned in the present patent application barely occur. The present patent application relates to the technique applied to the thin, high-strength brazing sheet for the purpose of reducing the weight of an automobile heat exchanger. The aluminum alloy brazing sheet finally obtained preferably has a thickness of 0.35 mm or less, more preferably 0.30 mm or less, and further preferably 0.25 mm or less.

(Method for Manufacturing Brazing Sheet)

A method for manufacturing an aluminum alloy brazing sheet for electric resistance welding of the present invention will be described. The brazing sheet of the present invention can be manufactured by the following method as a typical example.

First, the aluminum alloy for the core layer, the aluminum alloy for the sacrificial layer and the aluminum alloy for the brazing filler layer are melted and casted by a continuous casting method, thereby producing respective ingots. The ingots are subjected to face milling (surface planarization process) and homogeneous heat treatment, thereby fabricating the core-material ingot (core-material member), the sacrificial-material ingot and the brazing-material ingot. Thereafter, the sacrificial-material ingot and the brazing-material ingot are hot-rolled into predetermined thicknesses to produce a sacrificial-material member and a brazing-material member, respectively.

Subsequently, the sacrificial-material member and the brazing-material member are overlapped on one surface and the other surface of the core-material member, respectively. Such an overlapped member is subjected to a heat treatment (reheated), and then hot-rolled to pressure-bond into a sheet. Thereafter, these plate-shaped materials are subjected to cold-rolling, intermediate annealing if necessary, and finish cold-rolling.

The core-material ingot may not be subjected to the homogeneous heat treatment. The brazing-material ingot and the sacrificial-material ingot may have their thicknesses adjusted by face milling without being hot-rolled, thus producing the brazing-material member and the sacrificial-material member. The overlapped member may not be subjected to a heat treatment.

Conditions for the casting, homogeneous heat treatment, the hot-rolling, the cold-rolling, the intermediate annealing and the finish cold-rolling on the respective materials mentioned above can be set in accordance with the well-known standard methods.

Heat exchangers, such as a capacitor, an evaporator and an intercooler, mounted on automobiles generally have an assembled structure provided by combination of flat tubes for forming fluid flow passages and fins made by corrugating plates. The tubes and fins are overlapped alternately and repeatedly, and then, in order to collect the fluid flow passages, the tubes are fitted into a plate(s) (a header(s)) which is produced by press-forming a plate material(s). These parts are heated for brazing while being assembled, whereby bonding are formed between the tubes and the fins, and between the tubes and the plates, respectively thereby producing a heat exchanger. The brazing filler layer (molten brazing filler layer) melted by heating for brazing fills in connection parts between the components to form a brazing reservoir (fillet), thereby bonding these parts. The aluminum alloy brazing sheet for electric resistance welding of the present invention can be applied to such a tube and the like.

EXAMPLES

The present invention will further be described in detail below by way of Examples.

<Fabrication of Samples>

Tables 1, 2 and 3 show alloy compositions of brazing filler layers, core layers and sacrificial layers, respectively. Tables 4 and 5 show the combinations of the brazing filler layer, core layer and sacrificial layer of various alloy Nos. In Tables 1, 2 and 3, the underlined numeral values indicate compositional elements that do not satisfy the requirement defined by claims. In Tables 4 and 5, the underlined alloy Nos. indicate compositions that do not satisfy the requirement defined by claims in Tables 1 to 3.

TABLE 1

| Alloy No. | Brazing filler layer alloy composition with the balance being Al + inevitable impurities % by mass | | | Note |
|---|---|---|---|---|
| | Si | Na | Sr | |
| R1 | 5.5 | 0.0015 | 0.0000 | Inventive material |
| R2 | 12.0 | 0.0005 | 0.0060 | |
| R3 | 10.0 | 0.0003 | 0.0000 | |
| R4 | 10.0 | 0.0004 | 0.0000 | |
| R5 | 10.0 | 0.0005 | 0.0000 | |
| R6 | 10.0 | 0.0010 | 0.0000 | |
| R7 | 10.0 | 0.0020 | 0.0000 | |
| R8 | 10.0 | 0.0030 | 0.0000 | |
| R9 | 10.0 | 0.0000 | 0.0020 | |
| R10 | 10.0 | 0.0000 | 0.0030 | |
| R11 | 10.0 | 0.0000 | 0.0035 | |
| R12 | 10.0 | 0.0000 | 0.0095 | |
| R13 | 10.0 | 0.0000 | 0.0300 | |
| R14 | 10.0 | 0.0000 | 0.1000 | |
| R15 | 10.0 | 0.0005 | 0.0050 | |
| R16 | 10.0 | 0.0005 | 0.0080 | |
| R17 | <u>5.0</u> | 0.0010 | 0.0000 | Comparative material |
| R18 | <u>12.5</u> | 0.0004 | 0.0030 | |
| R19 | 10.0 | <u>0.0002</u> | 0.0000 | |
| R20 | 10.0 | <u>0.0035</u> | 0.0000 | |
| R21 | 10.0 | 0.0000 | <u>0.0015</u> | |
| R22 | 10.0 | 0.0000 | <u>0.1050</u> | |

TABLE 2

| No. | Core layer alloy composition with the balance being Al + inevitable impurities % by mass | | | | | | Note |
|---|---|---|---|---|---|---|---|
| | Si | Cu | Mn | Ti | Cr | Mg | |
| S1 | 0.10 | 0.70 | 1.30 | — | — | — | Inventive material |
| S2 | 0.90 | 0.70 | 1.30 | — | 0.05 | — | |
| S3 | 0.50 | 0.50 | 1.30 | — | 0.25 | — | |
| S4 | 0.50 | 1.20 | 1.30 | 0.05 | 0.05 | — | |
| S5 | 0.50 | 0.70 | 0.50 | 0.25 | — | — | |
| S6 | 0.50 | 0.70 | 2.00 | — | — | 0.05 | |
| S7 | 0.50 | 0.70 | 1.30 | — | — | 0.50 | |
| S8 | 0.50 | 0.70 | 1.30 | — | — | — | |
| S9 | 0.50 | 0.70 | 1.30 | — | 0.05 | — | |
| S10 | 0.50 | 0.70 | 1.30 | 0.10 | 0.20 | — | |
| S11 | 0.50 | 0.70 | 1.30 | 0.20 | — | 0.25 | |
| S12 | 0.50 | 0.70 | 1.30 | 0.10 | 0.05 | 0.15 | |
| S13 | <u>0.05</u> | 0.70 | 1.30 | — | — | — | Reference material |
| S14 | <u>1.05</u> | 0.70 | 1.30 | — | — | — | |
| S15 | 0.50 | <u>0.45</u> | 1.30 | — | 0.10 | — | |
| S16 | 0.50 | <u>1.25</u> | 1.30 | 0.10 | — | — | |
| S17 | 0.50 | 0.70 | <u>0.45</u> | — | — | 0.20 | |
| S18 | 0.50 | 0.70 | 1.30 | — | <u>0.30</u> | — | |

TABLE 2-continued

Core layer alloy composition with the
balance being Al + inevitable impurities
% by mass

| No. | Si | Cu | Mn | Ti | Cr | Mg | Note |
|---|---|---|---|---|---|---|---|
| S19 | 0.50 | 0.70 | 1.30 | 0.27 | 0.20 | — | |
| S20 | 0.50 | 0.70 | 1.30 | — | — | 0.55 | |

TABLE 3

Sacrificial layer alloy composition with the
balance being Al + inevitable impurities
% by mass

| Alloy No. | Si | Zn | Mg | Note |
|---|---|---|---|---|
| G1 | 0.21 | 3.00 | 2.00 | Inventive material |
| G2 | 0.80 | 3.00 | 2.00 | |
| G3 | 0.50 | 2.10 | 2.00 | |
| G4 | 0.50 | 5.00 | 2.00 | |
| G5 | 0.50 | 3.00 | 1.00 | |
| G6 | 0.50 | 3.00 | 4.50 | |
| G7 | 0.40 | 4.00 | 3.00 | |
| G8 | 0.15 | 3.00 | 2.00 | Reference material |
| G9 | 0.85 | 3.00 | 2.00 | |
| G10 | 0.50 | 1.90 | 2.00 | |
| G11 | 0.50 | 5.10 | 2.00 | |
| G12 | 0.50 | 3.00 | 0.90 | |
| G13 | 0.50 | 3.00 | 4.60 | |

The brazing filler layer, core layer and sacrificial layer with the alloy compositions shown in Tables 1 to 3 were casted and subjected to homogeneous heat treatment. Then, the brazing filler layer, core layer and sacrificial layer were overlapped on each other so as to exhibit a brazing-material cladding rate of 15% and a sacrificial-material cladding rate of 15%. The obtained overlapped member was hot-rolled to pressure-bond into a plate. Thereafter, the plate was subjected to cold-rolling and finish-annealing into a sheet of 0.25 mm in thickness.

The results of evaluation on the performance of each aluminum alloy brazing sheet fabricated are shown in Tables 4 and 5. Conditions for the evaluation of the performance were as follows.

<Measurement of Maximum Si Particle Size of Brazing Filler Layer>

In each sample, the surface of the brazing filler layer was polished, and any part of the surface was observed to measure the maximum diameters (maximum Si particle sizes) of the eutectic Si particles at 10 sites in the part, and determined an average of the maximum diameters. The measurement of the maximum Si particle size was performed on the longest size across a Si particle. When the Si particle had a polygonal shape, distances between opposed apexes of the polygonal shape were measured, and the maximum diameter or distance was defined as the maximum Si particle size. Samples having the maximum Si particle size of the brazing filler layer of 40 μm or less were rated as being good, while samples having the maximum Si particle size exceeding 40 μm were rated as being bad.

<Measurement of Viscosity of Molten Brazing Filler Layer at 650° C.>

In the measurement, an oscillating-plate viscometer was employed while using a vibrating reed made of platinum-alumina and having 1 mm thickness×30 mm width×30 mm length. Three kinds of standard solutions defined in accordance with JIS Z 8809:2000 were used to provide standard curves. Each sample was heated to 750° C., and then the attenuation of the amplitude of the sample during a cooling process was determined. The viscosity of the brazing filler layer in each sample was defined as an average of the viscosities measured at from 650 to 670° C. Samples having a viscosity of 0.01 Pa·s or less were rated as being good, whereas samples having a viscosity exceeding 0.01 Pa·s were rated as being bad.

<Evaluation on Electric Resistance Weldability>

Each aluminum alloy brazing sheet manufactured by the above-mentioned method was subjected to a slit process by a normal slittering device to be formed into strip materials with a width of 35 mm, followed by winding the strip material into a coil. The obtained strip material was wound in a tube shape by an electric resistance welded tube manufacturing device so that the sacrificial layer was faced inward, then welded into an electric resistance welded tube, and finally obtained a flat tube of 16 mm in length of the major axis and 2 mm in length of the minor axis.

Then, 100 m of the obtained electric resistance welded tube had its outer appearance observed to check the presence or absence of an unwelded part having a length of 1 mm or more in its longitudinal direction and the presence or absence of a spatter (mark). Samples with no unwelded part and no spatter attached were rated as having excellent weldability (A); samples with no unwelded part but with any spatter (mark) were rated as having very good weldability (B); and samples with four or less unwelded parts were rated as having good weldability (C). On the other hand, samples having five or more unwelded parts were rated as being bad (NG).

<Evaluation on Post-Brazing Tensile Strength>

After brazing the sample by a drop test system (after heating at a temperature of 600° C. for five minutes under a nitrogen atmosphere having a dew point of −40° C. an oxygen concentration of 200 ppm or less), the sample was processed into specimens of JIS No. 5 (specifically, three specimens were made from each sample). Each specimen was allowed to stand at room temperature (25° C.) for one week, and the post-brazing strength of the specimen was measured by a tensile test in conformity with JIS Z 2241: 2011. Samples having an average of the post-brazing strengths of the three specimens of 160 MPa or more were rated as being very good (A); samples having a strength average of not less than 120 MPa and less than 160 MPa were rated as being good (B); and samples having a strength average of less than 120 MPa were rated as being bad (C). Samples not applicable (NA) for evaluation were denoted as "-".

<Evaluation on Brazability>

A specimen with 25 mm width×60 mm length was cut out of each sample, and 5 g/m² of non-corrosive flux FL-7 (manufactured by MORITA CHEMICAL INDUSTRIES Co., Ltd.) was applied to the brazing filler layer surface of the specimen and then dried. The specimen (a lower sheet) was placed with the flux-applied surface of the brazing filler layer directed upward, and a 3003 alloy sheet (an upper sheet) with 1 mm thickness and 25 mm width×55 mm length was placed on the specimen vertically relative to the specimen via a round bar as a spacer made of stainless steel and having a diameter of 2 mm, and then they were fixed by wires. At this time, the position of the spacer was set at a distance of 50 mm from one end of the specimen. Onto this specimen, brazing was performed (by heating at 600° C. for five minutes under a nitrogen atmosphere having a dew point of −40° C. and an oxygen concentration of 200 ppm or less). Then, the length of a fillet charged into a gap between the specimen (the lower sheet) and the 3003 alloy sheet (the upper sheet) was measured. Samples having the fillet length of 25 mm or more were rated as having very good brazability (A); samples having the fillet length of not less than 10 mm and less than 25 mm were rated as having good brazability (B); and samples having the fillet length of less than 10 mm were rated as having bad brazability (D). Samples not applicable (NA) for evaluation were denoted as "-".

<Evaluation on Corrosion Resistance>

After brazing the sample by a drop test system (after heating at a temperature of 600° C. for five minutes under a nitrogen atmosphere having a dew point of −40° C. and an oxygen concentration of 200 ppm or less), the sample was cut into pieces with 50 mm width×60 mm length. In order to producing a specimen, the entire surface of each piece opposite to the brazing filler layer surface was covered with a masking seal having a size of 60 mm width×70 mm length, and the seal was folded toward the brazing filler layer surface side, whereby parts with a 5 mm width from the respective edges of the brazing filler layer were also covered with the folded seal. The specimen was subjected to a corrosion resistance test for 300 hours in conformity with SWAAT ASTM G85-A3. By visually checking corrosion states of the specimens, samples having the maximum corrosion depth of the specimens of 100 μm or less were rated as being very good (A); samples having the maximum corrosion depth exceeding 100 m without penetration corrosion were rated as being good (B); and samples having penetrating corrosion were rated as being bad (C). Samples not applicable (NA) for evaluation were denoted as "-".

TABLE 4

| | Structure | | | Viscosity | Maximum Si particle size of brazing | Properties | | | |
|---|---|---|---|---|---|---|---|---|---|
| | | | | | | Performance | | | |
| Sample No. | Brazing alloy material No. | Core alloy material No. | Sacrificial alloy material No. | of brazing filler layer Pa·s | filler layer μm | Electric resistance weldability | Post-brazing tensile strength | Brazability | Corrosion resistance |
| E1 | R1 | S1 | G1 | 0.0056 | 8.1 | B | A | A | A |
| E2 | R2 | S1 | G1 | 0.0036 | 23.2 | B | A | A | A |
| E3 | R3 | S1 | G1 | 0.0026 | 26.9 | B | A | A | A |
| E4 | R4 | S1 | G1 | 0.0028 | 14.0 | A | A | A | A |
| E5 | R5 | S1 | G1 | 0.0031 | 7.2 | A | A | A | A |
| E6 | R6 | S1 | G1 | 0.0043 | 9.5 | B | A | A | A |
| E7 | R7 | S1 | G1 | 0.0068 | 6.3 | B | A | A | A |
| E8 | R8 | S1 | G1 | 0.0093 | 5.3 | C | A | A | A |
| E9 | R9 | S1 | G1 | 0.0020 | 20.1 | B | A | A | A |
| E10 | R10 | S1 | G1 | 0.0021 | 12.8 | A | A | A | A |
| E11 | R11 | S1 | G1 | 0.0021 | 10.1 | A | A | A | A |
| E12 | R12 | S1 | G1 | 0.0026 | 6.1 | A | A | A | A |
| E13 | R13 | S1 | G1 | 0.0042 | 7.1 | B | A | A | A |
| E14 | R14 | S1 | G1 | 0.0098 | 5.3 | C | A | A | A |
| E15 | R15 | S1 | G1 | 0.0035 | 10.1 | A | A | A | A |
| E16 | R16 | S1 | G1 | 0.0037 | 9.9 | A | A | A | A |
| E17 | R11 | S2 | G1 | 0.0021 | 10.1 | A | A | A | A |
| E18 | R11 | S3 | G1 | 0.0021 | 10.1 | A | A | A | A |
| E19 | R11 | S4 | G1 | 0.0021 | 10.1 | A | A | A | A |
| E20 | R11 | S5 | G1 | 0.0021 | 10.1 | A | A | A | A |
| E21 | R11 | S6 | G1 | 0.0021 | 10.1 | A | A | A | A |
| E22 | R11 | S7 | G1 | 0.0021 | 10.1 | A | A | A | A |
| E23 | R11 | S8 | G1 | 0.0021 | 10.1 | A | A | A | A |
| E24 | R11 | S9 | G1 | 0.0021 | 10.1 | A | A | A | A |
| E25 | R11 | S10 | G1 | 0.0021 | 10.1 | A | A | A | A |
| E26 | R11 | S11 | G1 | 0.0021 | 10.1 | A | A | A | A |
| E27 | R11 | S12 | G1 | 0.0021 | 10.1 | A | A | A | A |
| E28 | R11 | S1 | G2 | 0.0021 | 10.1 | A | A | A | A |
| E29 | R11 | S1 | G3 | 0.0021 | 10.1 | A | A | A | A |
| E30 | R11 | S1 | G4 | 0.0021 | 10.1 | A | A | A | A |
| E31 | R11 | S1 | G5 | 0.0021 | 10.1 | A | A | A | A |
| E32 | R11 | S1 | G6 | 0.0021 | 10.1 | A | A | A | A |
| E33 | R11 | S1 | G7 | 0.0021 | 10.1 | A | A | A | A |
| E34 | R11 | S13 | G1 | 0.0021 | 10.1 | A | C | A | A |
| E35 | R11 | S14 | G1 | 0.0021 | 10.1 | A | A | A | C |
| E36 | R11 | S15 | G1 | 0.0021 | 10.1 | A | C | A | A |
| E37 | R11 | S16 | G1 | 0.0021 | 10.1 | A | A | A | C |
| E38 | R11 | S17 | G1 | 0.0021 | 10.1 | A | C | A | A |
| E39 | R11 | S18 | G1 | 0.0021 | 10.1 | A | A | A | C |
| E40 | R11 | S19 | G1 | 0.0021 | 10.1 | A | A | A | C |
| E41 | R11 | S20 | G1 | 0.0021 | 10.1 | A | A | C | A |
| E42 | R11 | S1 | G8 | 0.0021 | 10.1 | A | C | A | A |
| E43 | R11 | S1 | G9 | 0.0021 | 10.1 | A | A | A | C |
| E44 | R11 | S1 | G10 | 0.0021 | 10.1 | A | A | A | C |
| E45 | R11 | S1 | G11 | 0.0021 | 10.1 | A | C | A | A |
| E46 | R11 | S1 | G12 | 0.0021 | 10.1 | A | A | A | C |
| E47 | R11 | S1 | G13 | 0.0021 | 10.1 | A | A | A | C |

TABLE 5

| Sample No. | Structure | | | Properties | | Performance | | | |
|---|---|---|---|---|---|---|---|---|---|
| | Brazing alloy material No. | Core alloy material No. | Sacrificial alloy material No. | Viscosity of brazing filler layer Pa·s | Maximum Si particle size of brazing filler layer μm | Electric resistance weldability | Post-brazing tensile strength | Brazability | Corrosion resistance |
| C1 | R17 | S1 | G1 | 0.0043 | 6.0 | B | A | C | — |
| C2 | R18 | S1 | G1 | 0.0031 | 50.1 | NG | — | — | — |
| C3 | R19 | S1 | G1 | 0.0023 | 41.2 | NG | — | — | — |
| C4 | R20 | S1 | G1 | 0.0106 | 4.9 | NG | — | — | — |
| C5 | R21 | S1 | G1 | 0.0019 | 40.5 | NG | — | — | — |
| C6 | R22 | S1 | G1 | 0.0102 | 5.2 | NG | — | — | — |

In samples E1 to E33 shown in Table 4, the respective component materials in the combination of the brazing filler layer, core layer and sacrificial layer satisfied the requirement defined by claim 1, claim 2 or 3, or claim 4. Each of these samples was superior in electric resistance weldability, post-brazing tensile strength, brazability and corrosion resistance.

In samples E34 to 41 shown in Table 4, the composition of the core layer did not satisfy the requirement defined by claim 2 or 3 in the present invention. Each of these samples was slightly inferior in one or more performances of post-brazing tensile strength, brazability and corrosion resistance.

In samples E42 to 47 shown in Table 4, the composition of the sacrificial layer did not satisfy the requirement defined by claim 4 in the present invention. Each of these samples was slightly inferior in one or more performances of post-brazing tensile strength, brazability and corrosion resistance.

In samples C1 to C6 shown in Table 5, the composition of the brazing filler layer did not satisfy the requirement defined by claim 1 in the present invention. Sample C1 had good electric resistance weldability, but was inferior in brazability. Samples C2 to C6 were inferior in electric resistance weldability.

This application claims priority based on Japanese Patent Application No. 2014-068482, filed on Mar. 28, 2014, the disclosure of which is incorporated by reference herein.

DESCRIPTION OF REFERENCE NUMERALS 1a, 1b Squeeze rolls
2 Tube material
3 Spatter

The invention claimed is:

1. An aluminum alloy brazing sheet for electric resistance welding, the brazing sheet comprising a core layer and a brazing filler layer cladded on at least one surface of the core layer,
wherein:
the brazing filler layer is made of an aluminum alloy comprising
Si: 5.5 to 12.0% by mass,
Na: 0.0003 to 0.0030% by mass,
Sr: 0.0020 to 0.1000% by mass, and
Al and inevitable impurities;
the brazing filler layer in a molten state at 650° C. exhibits a viscosity of 0.01 Pa·s or less.

2. The aluminum alloy brazing sheet for electric resistance welding according to claim 1, wherein the core layer is made of an aluminum alloy comprising
Si: 0.10 to 1.00% by mass,
Cu: 0.50 to 1.20% by mass,
Mn: 0.50 to 2.00% by mass, and
Al and inevitable impurities.

3. The aluminum alloy brazing sheet for electric resistance welding according to claim 2, wherein the core layer further comprises at least one selected from the group consisting of
Ti: 0.05 to 0.25% by mass,
Cr: 0.05 to 0.25% by mass, and
Mg: 0.05 to 0.50% by mass.

4. The aluminum alloy brazing sheet for electric resistance welding according to claim 1, further comprising a sacrificial layer cladded on the other surface of the core layer,
wherein the sacrificial layer is made of an aluminum alloy comprising
Si: exceeding 0.20% by mass and 0.80% or less by mass,
Zn: exceeding 2.00% by mass and 5.00% or less by mass,
Mg: 1.00 to 4.50% by mass, and
Al and inevitable impurities.

5. The aluminum alloy brazing sheet for electric resistance welding according to claim 2, further comprising a sacrificial layer cladded on the other surface of the core layer,
wherein the sacrificial layer is made of an aluminum alloy comprising
Si: exceeding 0.20% by mass and 0.80% or less by mass,
Zn: exceeding 2.00% by mass and 5.00% or less by mass,
Mg: 1.00 to 4.50% by mass, and
Al and inevitable impurities.

6. The aluminum alloy brazing sheet for electric resistance welding according to claim 3, further comprising a sacrificial layer cladded on the other surface of the core layer,
wherein the sacrificial layer is made of an aluminum alloy comprising
Si: exceeding 0.20% by mass and 0.80% or less by mass,
Zn: exceeding 2.00% by mass and 5.00% or less by mass,
Mg: 1.00 to 4.50% by mass, and
Al and inevitable impurities.

* * * * *